United States Patent [19]

Yamada

[11] Patent Number: 4,767,133

[45] Date of Patent: Aug. 30, 1988

[54] SUSPENSION MEANS FOR SMALL VEHICLES

[75] Inventor: Yoshitake Yamada, Iwata, Japan

[73] Assignee: Yamaha Hatsudoki Kabushiki Kaisha, Iwata, Japan

[21] Appl. No.: 25,406

[22] Filed: Mar. 13, 1987

[30] Foreign Application Priority Data

Mar. 14, 1986 [JP] Japan .................................. 61-56410

[51] Int. Cl.$^4$ ............................................ B60G 11/22
[52] U.S. Cl. .................................................... 280/716
[58] Field of Search ................... 280/112 R, 671, 687, 280/688, 716; 267/63 R, 153

[56] References Cited

U.S. PATENT DOCUMENTS

| | | | |
|---|---|---|---|
| 2,851,282 | 9/1958 | Pogioli | 280/716 |
| 3,135,508 | 6/1964 | Boys | 280/716 |
| 3,464,716 | 9/1969 | Butler | 280/716 |
| 3,759,541 | 9/1973 | Peterson | 280/112 R |
| 4,500,113 | 2/1985 | Law | 280/716 |

*Primary Examiner*—Ross Weaver
*Attorney, Agent, or Firm*—Ernest A. Beutler

[57] ABSTRACT

An improved and simplified suspension system for a small vehicle such as a golf cart designed to be operated by a single rider in a standing fashion. The front wheels are carried by a single beam type axle that is pivotal about a central pivot axis. An elastic block front suspension is incorporated for providing a progressively increasing spring rate upon suspension movement. In addition, resilient fore and aft damping devices in the form of U-shaped resilient blocks engage the beam axle and restrain its fore and aft movement.

9 Claims, 5 Drawing Sheets

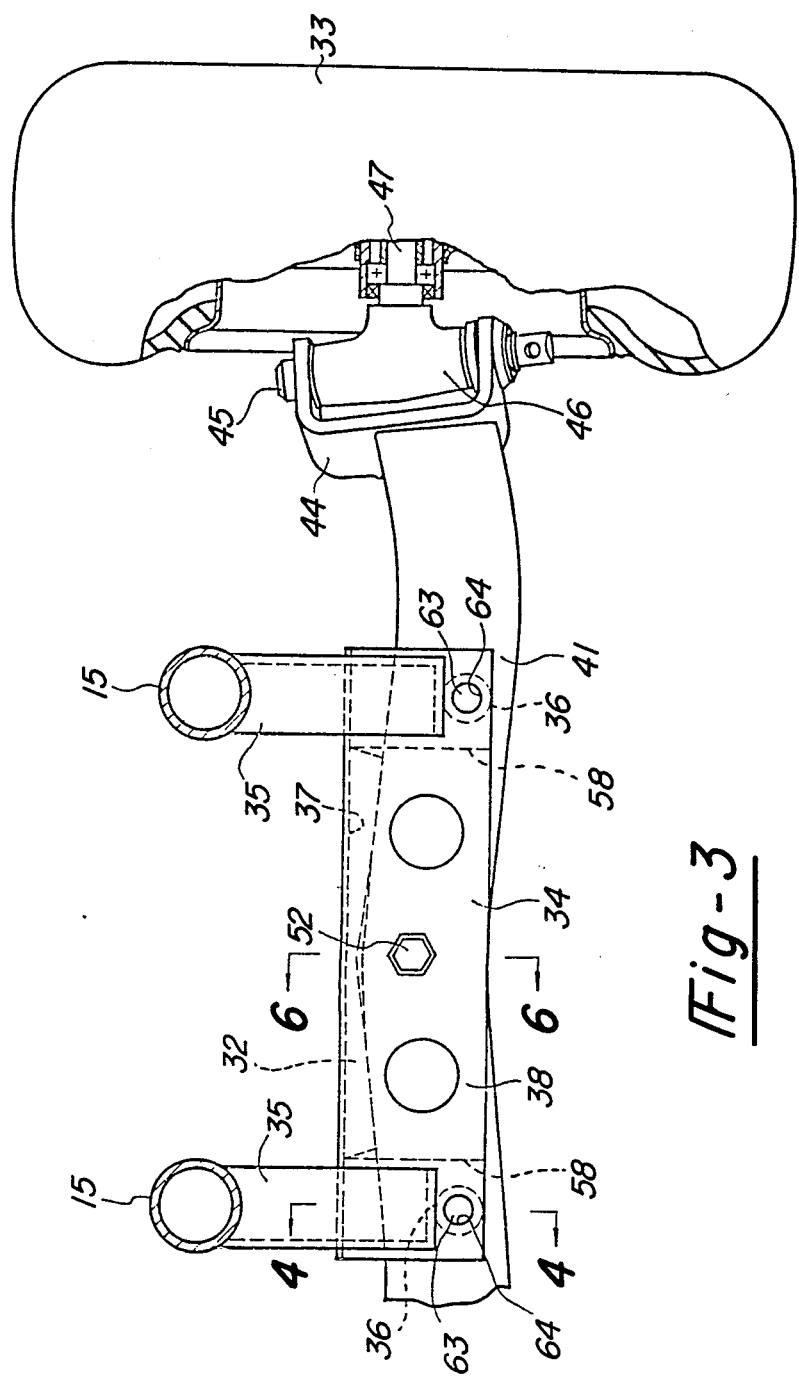

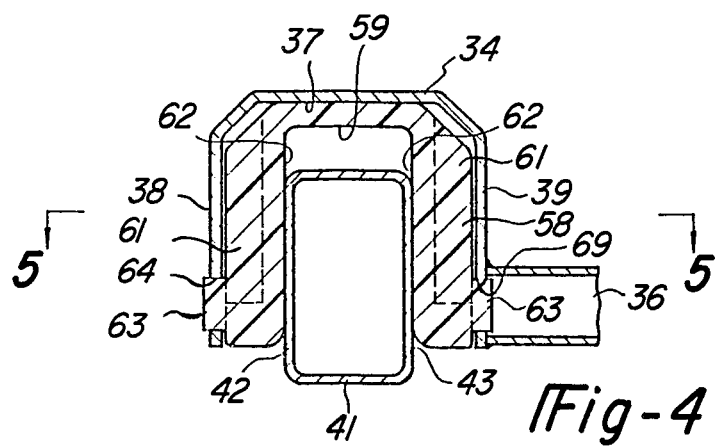
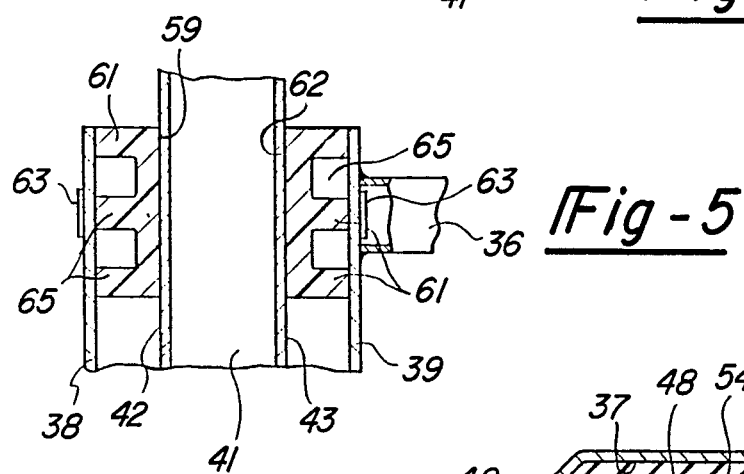
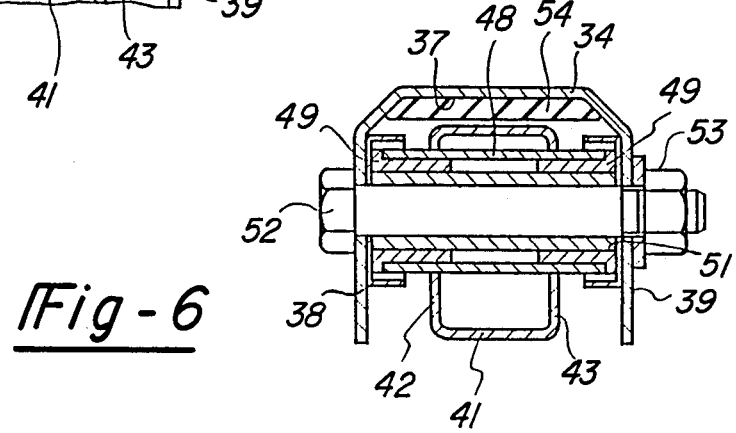

SUSPENSION MEANS FOR SMALL VEHICLES

BACKGROUND OF THE INVENTION

This invention relates to a suspension means for small vehicles and more particularly to an improved, simplified and highly effective suspension system for a small vehicle.

In many forms of vehicles, it is desirable to maintain the running components of the vehicle as simply as possible. This is done to reduce cost and maintenance. Furthermore, such simplicity insures against problems with the vehicle during long periods of use or under adverse use conditions.

One of the components or systems of a vehicle in which simplicity is particularly desirable is the suspension system for the vehicle. Although a number of vehicles have been designed and proposed in which no suspension system whatsoever is used, the absence of a suspension system is not always desirable. For example, in such a small vehicle as a single rider golf cart in which the rider operates the cart from a standing position, the absense of a suspension system for at least some of the wheels may be undesirable. Because such vehicles operate over undulating and uneven terrain, it is desirable to provide a suspension system so that the rider will be stable during vehicle operation. However, because of the small size and low cost of these vehicles, any suspension system for the vehicle should be extremely simple but nevertheless highly effective.

It is, therefore, a principal object of this invention to provide an improved suspension system for small vehicles.

It is a further object of the invention to provide an effect, compact and simple suspension system for a small vehicle, particularly one of the type designed to be operated by a single rider.

In a golf cart of the type described, it is particularly advantageous if the vehicle has four wheels. The use of four wheeled vehicles insures greater stability which is particularly important due to the terrain over which such vehicles operate. However, when a four wheeled vehicle is provided with a suspension system, the suspension systems can become quite complicated.

It is, therefore, a further object of this invention to provide an improved and simplififed suspension system for a pair of wheels of a four wheeled vehicle.

It is a further object of this invention to provide an improved suspension system for a pair of vehicle wheels embodying a single spring and one which is simple in construction but effective in providing damping over wide degrees of suspension travels.

One particularly simple form of vehicle suspension employs a single pivotally supported suspension arm for suspending the wheel for its suspension travel. Although such arrangements offer the advantage of simplicity, it is necessary to mount the arm in such a way that its fore and aft movement is controlled and substantially restricted.

It is, therefore, a still further object of this invention to provide an improved arrangement for controlling the fore and aft movement of a vehicle suspension art.

SUMMARY OF THE INVENTION

A first feature of this invention is adapted to be embodied in a suspension system for a vehicle that comprises a frame assembly and a suspension arm that is adapted to journal a wheel at one end thereof and which is pivotally suspended upon the frame assembly at a point spaced from this one end. In accordance with this feature of the invention, an elastic block is interposed between the frame assembly and the suspension arm and is positioned to be engaged and deflected upon pivotal movement of the suspension arm for resiliently resisting the pivotal movement. The elastic block and the suspension arm are configured to prevent a progressively greater contact area upon increased pivotal movement for progressively increasing the resistance to continued pivotal movement.

Another feature of the invention is also adapted to be embodied in a suspension system for a vehicle comprising a frame assembly and a suspension arm that is adapted to journal a wheel at one end thereof and which is pivotally supported upon the frame assembly at a point spaced from the one end. In accordance with this feature of the invention, spring means are provided for resiliently resisting pivotal movement of the suspension arm and a fore and aft damping means is provided for restricting the fore and aft movement of the suspension arm relative to the frame assembly. The fore and aft damping means comprises a generally U-shaped member that is adapted to be affixed to the frame assembly and which has its spaced arms slidably engaged with the suspension arm for restraining the fore and aft movement of the suspension arm.

BRIEF DESCRIPTION OF THE DRAWINGS

FIG. 3 is a front elevational view showing the front wheel suspension system, with portions broken away and other portions shown in section.

FIG. 4 is a cross-sectional view taken along the line 4—4 of FIG. 3.

FIG. 5 is a cross-sectional view taken along the line 5—5 of FIG. 4.

FIG. 6 is a cross-sectional view taken along the line 6—6 of FIG. 3.

DETAILED DESCRIPTION OF THE PREFERRED EMBODIMENT

Figure 1:
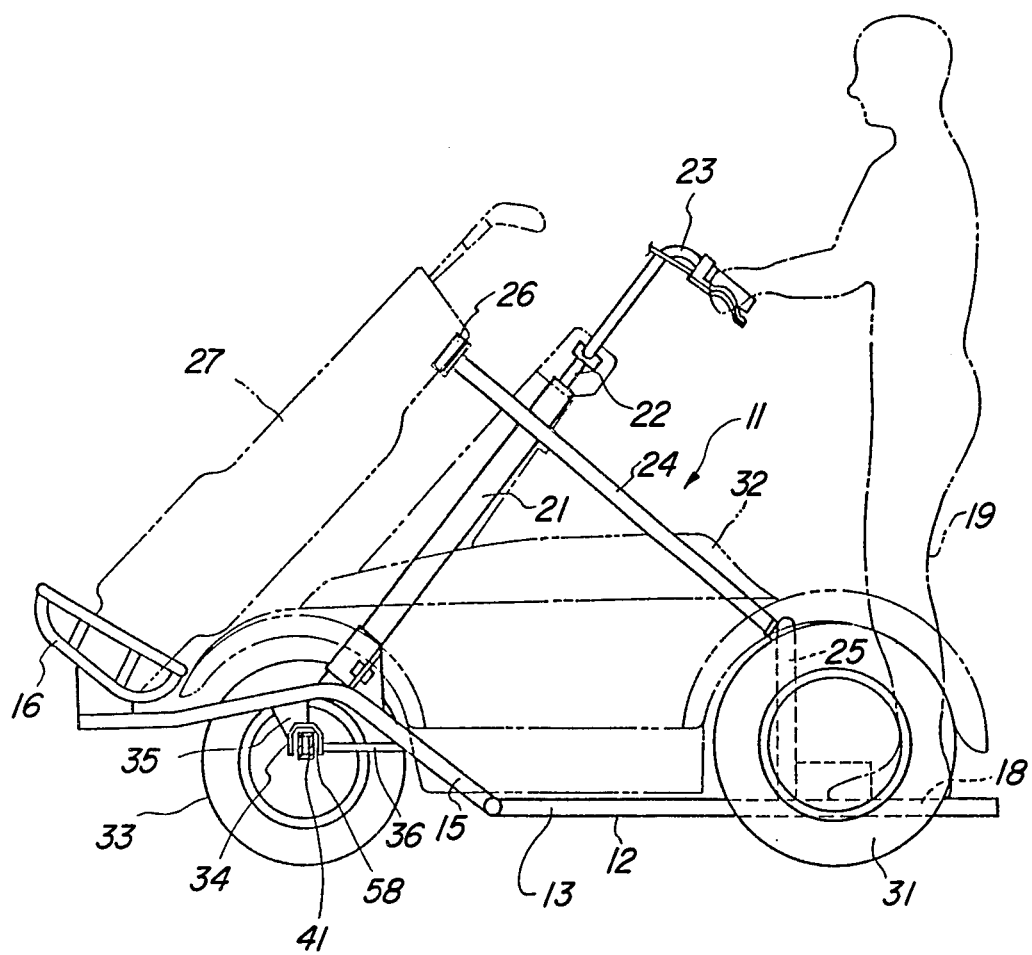
FIG. 1 is a side elevational view of a vehicle embodying a suspension system constructed in accordance with an embodiment of the invention, with portions of the vehicle being shown in phantom.
Figure 2:
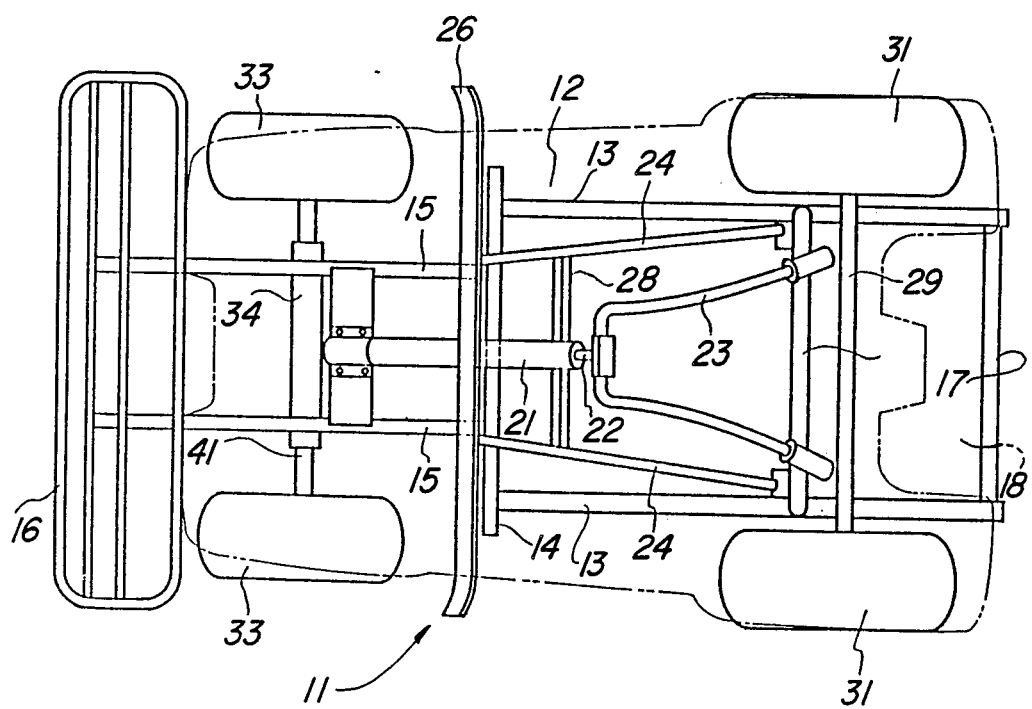
FIG. 2 is a top plan view of the vehicle and specifically shows its frame assembly in solid lines with the remaining portion of the vehicle in phantom lines.

Referring now in detail to the drawings and first primarily to FIGS. 1 and 2, a small vehicle embodying a suspension system constructed in accordance with an embodiment of the invention is identified generally by the reference numeral 11. The vehicle 11 is a golf cart of the type that is designed to be operated by a single rider operating in a standing position.

The vehicle 11 includes a frame assembly, indicated generally by the reference numeral 12 which is depicted as being of a welded up tubular construction. This frame assembly 12 comprises a pair of longitudinally extending main frame members 13 that extend in parallel fashion and which are interconnected at their forward ends by means of a cross member 14. Extending forwardly from the cross member 14 but spaced more narrowly relative to the main frame members 13 is a pair of front frame members 15. The front frame members 15 are interconnected at their forward ends by a combined bumper and bag carrier 16.

The rear ends of the main frame members 13 are interconnected by means of a cross member 17. A platform 18 is carried by this rear end portion of the main frame members 13 and the cross member 17 and is designed to support a single rider in a standing fashion, as shown in phantom at 19 in FIG. 1.

A steering mast 21 is affixed at its lower end to the frame members 15 and extends upwardly and rearwardly. A steering column 22 is journaled in a known manner by the steering mast 21 and carries a handlebar 23 at its upper end for rider control of the steering in an appropriate manner.

The upper end of the steering mast 21 is supported by means of a pair of angular inclined frame members 24 that are affixed at thier lower rearward ends to a hoop shaped member 25 which is, in turn, affixed to the main frame members 13. The members 24 extend forwardly beyond the steering mast 21 and carry a bag support 26 that is adapted to engage and support one or more golf bags, shown in phantom at 27, that are contained within the bag carrier 16.

The frame members 24 are further reinforced by means of a cross member 28. The cross member 28 may be affixed in any known manner to the frame members 24, as by welding.

The frame assembly 12 as thus far described may be made up of a weldment consisting of the members as thus far described, the majority of which are tubular. However, when the term "frame assembly" is used in the specification and claims, it is intended to encompass any structural component of a vehicle which supports a wheel for suspension movement.

At the rear end of the frame assembly 12 and specifically at the rear end of the frame members 13, there is journaled in an appropriate manner an axle shaft 29 that carries a pair of rear wheels 31 in a known manner. The rear axle 29 and/or rear wheels 31 are driven in an appropriate manner by a power source contained within a body, indicated by the reference numeral 32 and shown in phantom. The driving arrangement for the rear wheels 31 may be of any known type.

The vehicle 11 is also provided with a pair of spaced apart front wheels 33 that are suspended at the forward end of the frame assembly 12 by a suspension system constructed in accordance with the invention and which may be best understood by reference to FIGS. 3 through 6, in addition to FIGS. 1 and 2.

The suspension system for the front wheels 33 includes a generally inverted U-shaped frame member 34 that is carried by the frame members 15 through a pair of downwardly depending brackets 35. The frame member 34 further is supported in a fore and aft direction by means of a pair of horizontally extending frame members 36 which are welded at their rear ends to the frame members 15 and at their forward ends to the frame member 34. Hence, a very rigid supporting structure is provided for the frame member 34.

As has been noted, the frame member 34 has a generally inverted U-shape configuration and this consists of a cross leg 37 and a pair of depending front and rear legs 38 and 39, respectively. The frame members 36 are directly affixed, as by welding, to the rear legs 39.

A beam type axle 41 has its central portion contained within the frame member 34. The front axle 41 is formed of a box-shaped configuration that includes a front face 42 and a rear face 43. The faces 42 and 43 are parallel to each other and are also parallel to the frame member legs 38 and 39.

The outer ends of the beam-shaped front axle 41 carry generally C-shaped members 44. A king pin 45 is affixed suitably to the members 44 and carries a spindle carrier 46 for steering movement under the control of the handlebar 23. The mechanism for steering the spindle carrier 46 can be of any known type. A spindle 47 extends from each spindle carrier 46 and rotatably journals the respective front wheel 33 in a known manner.

A tubular member 48 (FIG. 6) is affixed to and extends through the opposite faces 42 and 43 of the beam axle 41 at a central location. The tube 48 is spaced inwardly from the legs 38 and 39 of the frame member 34. A pair of spaced apart anti-friction bearings 49 are received within the tube 48 and journal the axle 43 on a cylindrical bushing 51. The bushing 51 is axially held in place relative to the frame member 34 by a longitudinally extending bolt 52 and nut 53 so as to pivotally support the axle 41 and wheels 33 relative to the frame assembly.

A resilient spring, indicated generally by the reference numeral 54, is interposed between the frame assembly 12 and the front axle 41 for damping the suspension movement. The spring 54 comprises a block of elastomeric material that is affixed in any suitable manner, as by bonding or vulcanizing, to the frame member 34. The elastomeric material 54 has a configuration that is comprised of a pair of triangular shaped sections 54 that are joined at their respective apices over the pivot bolt 52. Hence, each of these triangular shaped portions cooperates with a respective side of the beam axle 41 for dampening its pivotal movement depending upon which of the front wheels 33 strikes an obstruction.

It should be noted that the configuration of the elastomeric block 54 is such that the lower face 56 of the triangle is disposed at an angle to the normal upper surface of the front axle 41 so as to provide a tapering clearance 57. The reason for this will be described and it cooperates so as to provide a progressively increasing spring rate.

Figure 7:
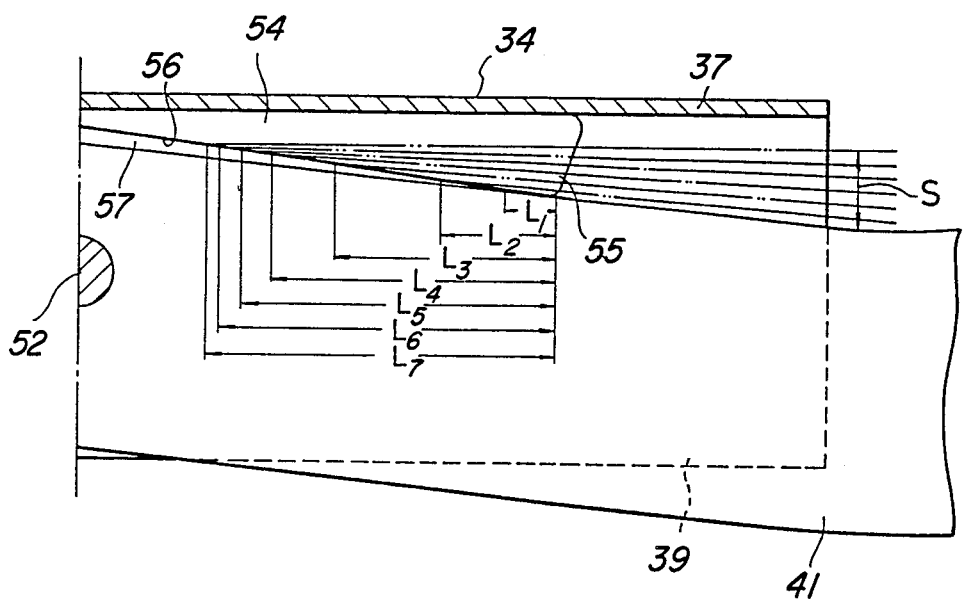
FIG. 7 is an enlarged view taken generally in the same plane as FIG. 3, with a portion broken away, showing the progressive nature of the spring arrangement.

Referring now specifically to FIG. 7, it will be noted that in the normal unladened condition and undeformed state, there is a relatively small area $L_1$ of length of the axle 41 that engages the outer side of the elastomeric member 54. However, as the angular movement progressively increases through the range S, there will be a progressively larger contact area $L_2$-$L_3$-$L_4$-$L_5$-$L_6$-$L_7$ so that the spring formed by the elastomeric member 54 will progressively increase in stiffness. Hence, there is provided a non-linear spring that permits relatively soft suspension movement during the encounter of slight obstacles but which progressively gets more rigid so as to avoid bottoming out.

It should be reaily apparent that the use of the single spring comprised of the elastomeric block 54 and the single pivot for the front axle provided by the pivot bolt 52 provides a relatively simple construction. Thus, the device can be easily serviced and has few moving parts that can become worn.

However, because of the single pivotal axis, there is the likelihood of fore and aft movement of the wheels 33. Such fore and aft movement is resiliently restrained, however, by a construction as best shown in FIGS. 3, 4 and 5. In accordance with this feature of the invention, there are provided a pair of elastomeric blocks, indicated generally by the reference numeral 58, one at each side of the frame member 34. Each of the blocks 39 is formed from a material that may be more rigid than the elastic spring 54, although other constructions are possible. The elastic blocks 58 also have an inverted U-shape comprised of a horizontally extending leg 59 and front and rear vertically extending legs 61. The device is symmetric and the leg 61 define facing bearing surfaces 62 that embrace the front axle surfaces 42 and 43 and prevent fore and aft movement. It should be noted that the legs 61 have cylindrical projections 63 that are received in respective openings 64 formed in the frame member 34 so as to retain the blocks 58 in position. If some fore and aft compliance is desired, the block legs 61 may be formed with respective vertically extending recesses 65 so as to afford some softness in this direction.

It should be readily apparent from the foregoing description that a very effective and yet very simple front suspension has been provided for a small vehicle. Although an embodiment of the invention has been illustrated and described, it should be understood by those skilled in the art that various changes and modifications may be made without departing from the spirit and scope of the invention, as defined by the appended claims.

I claim:

1. A suspension system for a vehicle comprising a frame assembly, a suspension arm adapted to journal a wheel at one end thereof and being pivotally suspended upon said frame assembly at a pivot point spaced from said one end, an elastic block interposed between said frame assembly and said suspension arm contiguous to said pivot point and positioned to be engaged and deflected upon pivotal movement of said suspension arm for resiliently resisting said pivotal movement, said elastic block and said suspension arm being configured to present a progressively greater contact area upon increased pivotal movement of said arm for progressively increasing the resistance to continued pivotal movement.

2. A suspension system as set forth in claim 1 wherein the block has a triangular configuration and the corresponding surface of the suspension arm has an inclined surface relative to the adjacent leg of the triangle.

3. A suspension system as set forth in claim 1 wherein the suspension arm comprises a beam type axle journaling a wheel at each end thereof and pivotally supported between its ends upon the frame assembly and wherein the elastic block is configured to yieldably resist pivotal movement of said suspension arm in either direction about said pivot point.

4. A suspension system as set forth in claim 3 wherein the block has a V shaped configuration and the corresponding surface of the suspension arm has inclined surfaces relative to said V with the bight of said V contiguous to said pivot point.

5. A suspension system as set forth in claim 1 further including resilient means for resiliently resisting fore and aft movement of the suspension arm.

6. A suspension system as set forth in claim 5 wherein the resilient means for resisting the fore and aft movement comprises a generally U-shaped elastic block affixed to the frame assembly outwardly of the pivot axis of the suspension arm and slidably engaged with said suspension arm.

7. A suspension system for a vehicle comprising a frame assembly, a suspension arm adapted to journal a wheel at one end thereof and being pivotally suspended upon said frame assembly at a point spaced from said one end, spring means for resiliently resisting pivotal movement of said suspension arm, and fore and aft damping means for restricting fore and aft movement of said suspension arm relative to said frame assembly, said damping means comprising a generally U-shaped member affixed to said frame assembly at a point spaced from the pivotal support of said suspension arm and having spaced arms slidably engaging said suspension arm for resisting fore and aft movement thereof.

8. A suspension system as set forth in claim 7 wherein the damping means is affixed to the frame assembly by means of a pair of outwardly extending projections formed upon the spaced arm and received in complementary shaped apertures in the frame assembly.

9. A suspension system as set forth in claim 1 wherein the elastic block and the suspension arm are interrelated in such a way that the elastic block damps pivotal movement of the suspension arm in either direction about the pivot point.

* * * * *